US007873636B2

(12) United States Patent
Brown et al.

(10) Patent No.: US 7,873,636 B2
(45) Date of Patent: Jan. 18, 2011

(54) METHOD, SYSTEM AND PROGRAM PRODUCT FOR MATCHING A NETWORK DOCUMENT WITH A SET OF FILTERS

(75) Inventors: Kyle Gene Brown, Apex, NC (US); Keyur Dilip Dalal, Cary, NC (US); Mark Douglas Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/427,794

(22) Filed: May 1, 2003

(65) Prior Publication Data

US 2004/0220909 A1    Nov. 4, 2004

(51) Int. Cl.
  *G06F 17/30* (2006.01)
(52) U.S. Cl. .................. 707/736; 707/752; 707/754; 707/770
(58) Field of Classification Search .............. 707/3, 707/4, 102, 100, 736, 752, 754, 770; 715/513; 709/204
See application file for complete search history.

(56) References Cited

U.S. PATENT DOCUMENTS

| 5,560,007 | A * | 9/1996 | Thai .................. 707/999.003 |
| 6,278,452 | B1 * | 8/2001 | Huberman et al. ........ 707/999.1 |
| 6,341,280 | B1 * | 1/2002 | Glass et al. .................. 707/754 |
| 6,453,312 | B1 * | 9/2002 | Goiffon et al. .................. 707/3 |
| 6,487,566 | B1 | 11/2002 | Sundaresan |
| 6,564,244 | B1 * | 5/2003 | Ito et al. .................... 709/204 |
| 6,857,102 | B1 * | 2/2005 | Bickmore et al. .... 707/E17.121 |
| 2001/0037345 | A1 | 11/2001 | Kiernan et al. |
| 2002/0097278 | A1 | 7/2002 | Mandler et al. |
| 2002/0111965 | A1 | 8/2002 | Kutter |
| 2002/0116371 | A1 | 8/2002 | Dodds et al. |
| 2002/0116412 | A1 | 8/2002 | Barnes et al. |
| 2002/0147805 | A1 * | 10/2002 | Leshem et al. .............. 709/223 |
| 2002/0169788 | A1 | 11/2002 | Lee et al. |
| 2003/0014397 | A1 | 1/2003 | Chau et al. |
| 2003/0014438 | A1 | 1/2003 | Devillers |
| 2003/0018621 | A1 * | 1/2003 | Steiner et al. .................. 707/3 |
| 2003/0037041 | A1 * | 2/2003 | Hertz ............................ 707/1 |
| 2005/0010567 | A1 * | 1/2005 | Barth et al. .................... 707/3 |
| 2007/0156677 | A1 * | 7/2007 | Szabo ............................ 707/5 |
| 2008/0177731 | A1 * | 7/2008 | Matsuzaki ...................... 707/5 |
| 2010/0169341 | A1 * | 7/2010 | Hu et al. .................... 707/758 |

OTHER PUBLICATIONS

IBM Research Disclosure No. 452164, "Fast XML Document Recognition", pp. 2146-2147, Dec. 2001.
Schlieder et al., "Result Ranking for Structured Queries Against XML Documents", pp. 1-6, German Research Society, Berlin-Brandenburg School in Distributed Information Systems, (DFG grant No. GRK 316).

* cited by examiner

*Primary Examiner*—Charles Rones
*Assistant Examiner*—Rezwanul Mahmood
(74) *Attorney, Agent, or Firm*—Jeanine S. Ray-Yarletts, Esq.; Scott D. Paul, Esq.; Carey Rodriguez Greenberg & Paul LLP

(57) ABSTRACT

Under the present invention, a set of filters (e.g., one or more) is associated with a hierarchical tree, which includes sets of namespace nodes, element nodes and variable nodes. Once the set of filters is associated with the hierarchical tree, a network document is parsed and compared to the hierarchical tree to identify a set of corresponding filters. Each corresponding filter is then evaluated based on the network document to determine which, if any, are "satisfied." The network document is then communicated to the user(s) that correspond to the satisfied filter(s).

25 Claims, 3 Drawing Sheets

METHOD, SYSTEM AND PROGRAM PRODUCT FOR MATCHING A NETWORK DOCUMENT WITH A SET OF FILTERS

BACKGROUND OF THE INVENTION

1. Field of the Invention

The present invention generally relates to a method, system and program product for matching a network document with a set of filters. Specifically, the present invention associates a set of filters with a hierarchical tree so that network documents and the like can be efficiently matched with filters.

2. Related Art

As computer technology continues to advance, computer users are increasingly relying on networks such as the World Wide Web to obtain information. For example, today a computer user can obtain news articles, sports scores, and business information over the Internet. In an attempt to capitalize on this growing trend, various services (e.g., subscription-based) have been developed to allow computer users to receive desired information. In general, these services allow a computer user to designate the type of information they wish to receive by creating one or more filters/queries. For example, if a computer user wishes to receive only sport scores related to a particular professional baseball team, the computer user will create a filter that incorporates those requirements. Once this filter is in place, the computer user will only be presented with network documents that have sports scores for that particular professional baseball team. A network document is any document that conforms to a markup language such as XML or HTML and that is communicated over a network.

Unfortunately, while processing (e.g., managing and applying) filters for a small number of computer users is relatively easy, the task becomes extremely burdensome and expensive as the number of computer users grow. Specifically, a given "service" can be responsible for delivering network documents to several thousand computer users, with each computer user having one or more filters. To date, the processing of the filters has largely occurred in two different, yet inefficient, ways. One approach involved communicating all network documents to every computer user (e.g., to the clients from the server), and then applying the filters on the clients. Such an approach is highly inefficient because it requires all network documents (even undesired documents) to be communicated to, and processed by, each client. Another approach applied a linear search technique at the server. Specifically, each document was individually compared to every filter at the server. Documents that satisfied the filters would then be communicated to the corresponding clients for the computer users to view. This linear search technique is also inefficient because it requires every network document to be individually compared to every filter. Moreover, the linear search technique requires an enormous duplication of effort. For example, if 10,000 computer users desired to receive network documents listing scores for the Atlanta Braves, they would all have the same filter, which would be evaluated 10,000 times.

In view of the foregoing, there exists a need for an efficient way to manage and apply filters to network documents. Specifically, a need exists for a method, system and program product for matching a network document with a set of filters. A further need exists for a set of filters to be associated with a hierarchical tree. Another need exists for a set of corresponding filters to be identified from the set of filters by comparing a network document to the hierarchical tree. Still yet, a need exists for the set of corresponding filters to be evaluated based on the network document so that a set of satisfied filters can be identified.

SUMMARY OF THE INVENTION

In general, the present invention provides a method, system and program product for matching a network document (e.g., XML, HTML, etc.) with a set of (satisfied) filters. Specifically, under the present invention, a set of filters (e.g., one or more) is associated with a hierarchical tree, which includes sets of namespace nodes, element nodes and variable nodes. Once the set of filters is associated with the hierarchical tree, a network document is parsed and then compared to the hierarchical tree to identify a set of corresponding filters. Each corresponding filter is then evaluated based on the network document to determine which, if any, are "satisfied." The network document is then communicated to the user(s) that correspond to the satisfied filter(s).

According to a first aspect of the present invention, a method for matching a network document with a set of filters is provided. The method comprises: associating a set of filters with a set of nodes of a hierarchical tree; identifying a set of corresponding filters from the set of filters by comparing the network document to the hierarchical tree; and evaluating the set of corresponding filters based on the network document to identify a set of satisfied filters.

According to a second aspect of the present invention, a system for matching a network document with a set of filters is provided. The system comprises: a tree generation system for generating a hierarchical tree and for associating a set of filters with a set of nodes of the hierarchical tree; a filter identification system for identifying a set of corresponding filters from the set of filters by comparing the network document to the hierarchical tree; and a filter evaluation system for evaluating the set of corresponding filters based on the network document to identify a set of satisfied filters.

According to a third aspect of the present invention, a program product stored on a recordable medium for matching a network document with a set of filters is provided. When executed, the program product comprises: program code for generating a hierarchical tree and for associating a set of filters with a set of nodes of the hierarchical tree; program code for identifying a set of corresponding filters from the set of filters by comparing the network document to the hierarchical tree; and program code for evaluating the set of corresponding filters based on the network document to identify a set of satisfied filters.

Therefore, the present invention provides a method, system and program product for matching a network document with a set of filters.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for matching a network document (e.g., XML, HTML, etc.) with a set of (satisfied) filters. Specifically, under the present invention, a set of filters (e.g., one or more) is associated with a hierarchical tree, which includes sets of namespace nodes, element nodes and variable nodes. Once the set of filters is associated with the hierarchical tree, a network document is parsed and then compared to the hierarchical tree to identify a set of corresponding filters. Each corresponding filter is then evaluated based on the network document to determine which, if any, are "satisfied." The network document is then communicated to the user(s) that correspond to the satisfied filter(s).

It should be understood that as used herein, "network document" is intended to refer to any type of document or other medium by which information can be expressed that can be communicated over a network. In a typical embodiment, the network document is based on Standard Generated Markup Language (SGML). Examples include an Extended Markup Language (XML) document and a Hypertext Markup Language (HTML) document. It should also be understood that the term "set" as used herein is intended to mean a quantity of one or more. For example, a set of filters refers to one or more filters.

Figure 1:
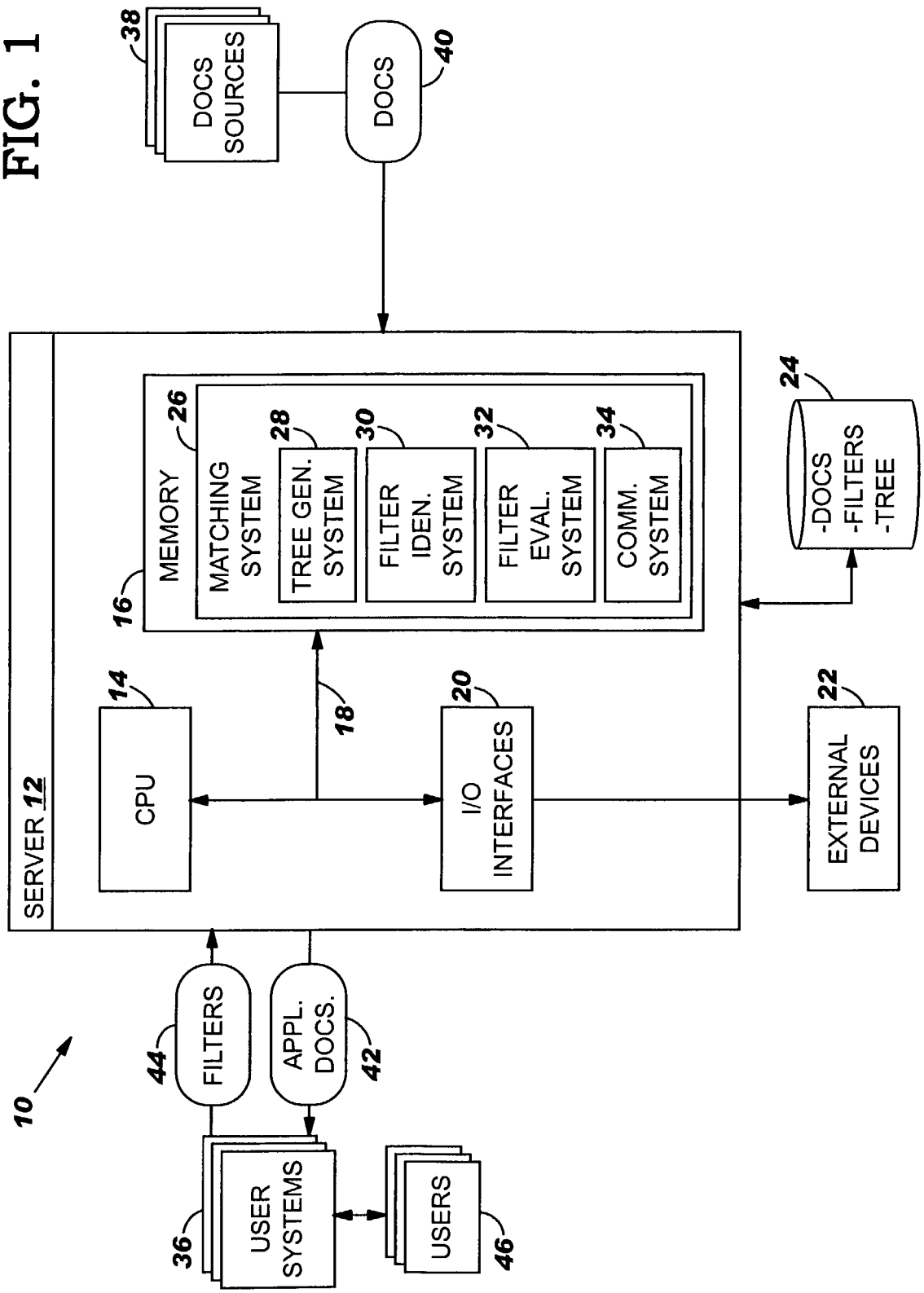
FIG. 1 depicts a system for matching a network document with a set of filters, according to the present invention.

Referring now to FIG. 1, a system 10 for matching network documents 40 with a set of filters 44 according to the present invention is shown. As depicted, system 10 includes server 12, which communicates with one or more user systems 36 and one or more document sources 38. Since "network document" is intended to refer to any type document or the like that can be communicated over a network, server 12, user systems 36 and document sources 38 can communicate over the Internet, a wide area network (WAN), a local area network (LAN), a virtual private network (VPN), or any other type of network. To this extent, communication between server 12, user systems 36 and document sources 38 could occur via a direct hardwired connection (e.g., serial port), or via an addressable connection. Such communication typically occurs in a client-server (or server-server) environment that could utilize any combination of wireline and/or wireless transmission methods. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, server 12 generally includes central processing unit (CPU) 14, memory 16, bus 18, input/output (I/O) interfaces 20, external devices/resources 22 and storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LED screen, hand-held device, keyboard, mouse, voice recognition system, speech output system, printer, monitor/display, facsimile, pager, etc. Bus 18 provides a communication link between each of the components in server 12 and likewise may comprise any known type of transmission link, including electrical, optical, wireless, etc. In addition, although not shown, additional components, such as cache memory, communication systems, system software, etc., may be incorporated into server 12.

Storage unit 24 can be any system (e.g., a database) capable of providing storage for network documents 40, filters 44 and a hierarchical tree under the present invention. As such, storage unit 24 could include one or more storage devices, such as a magnetic disk drive or an optical disk drive. In another embodiment, storage unit 24 includes data distributed across, for example, a local area network (LAN), wide area network (WAN) or a storage area network (SAN) (not shown). It should be understood that although not shown, user systems 36 and/or document sources 38 are typically computerized systems that include components (e.g., CPU, memory, etc.) similar to server 12. Such components have not been depicted for brevity purposes only.

In general, users 46 operate user systems 36 to obtain certain, desired content/information in the form of applicable network documents 42 from server 12. Typically, server 12 receives a set (e.g., one or more) of network documents 40 from document sources 38, and applies a set (e.g., one or more) of filters 44 provided by users 46 to determine which network documents 42 should be communicated to which users 46. To this extent, each user 46 could provide one or more filters 44 that designate the type of information he/she wishes to receive. Filters 44 generally include one or more requirements/criterion and are typically constructed using any query language. Accordingly, as will be further shown below, filters 44 could utilize any Boolean operator(s) such as AND and OR.

Under the present invention, filters 44 are received by server 12 and are associated with a hierarchical tree by matching system 26. As depicted, matching system 26 includes tree generation system 28, filter identification system 30, filter evaluation system 32 and communication system 34. As will be further described below, tree generation system 28 generates a hierarchical tree having nodes that generally correspond to types of information contained in network documents 40. Once the tree is generated, filters 44 are associated therewith. Filter identification system 30 will then compare network documents 40 received from document sources 38 to the hierarchical tree to determine which of the set of filters correspond thereto. Once identified, the set of corresponding filters are evaluated based on the network documents 40 by filter evaluation system 32 to determine which, if any, are actually satisfied. Evaluation of each corresponding filter is done because a single filter could have more than one requirement or variable. For example, user "A" could have created filter "X" that dictates he/she only wanted to receive network documents that includes final game scores for the Atlanta Braves AND information on free agent signings. Filter "X" would be identified as corresponding to a network document that includes only sports scores for the Atlanta Braves. However, upon evaluation, it would be determined that the network document does not have the additional information regarding free agent signings required by user in filter "X." Accordingly, the filter would not be identified as being "satisfied" by (i.e., matching) the network document.

Figure 2:
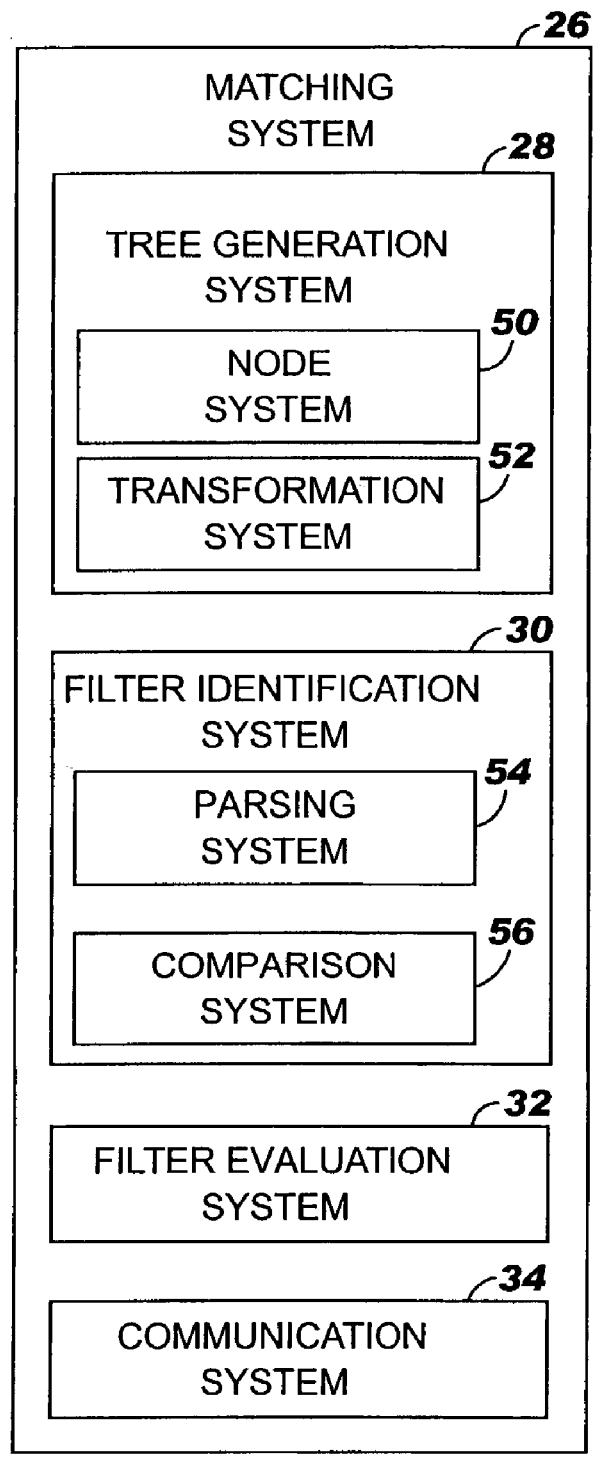
FIG. 2 depicts a more detailed diagram of the matching system of FIG. 1, according to the present invention.
Figure 3:
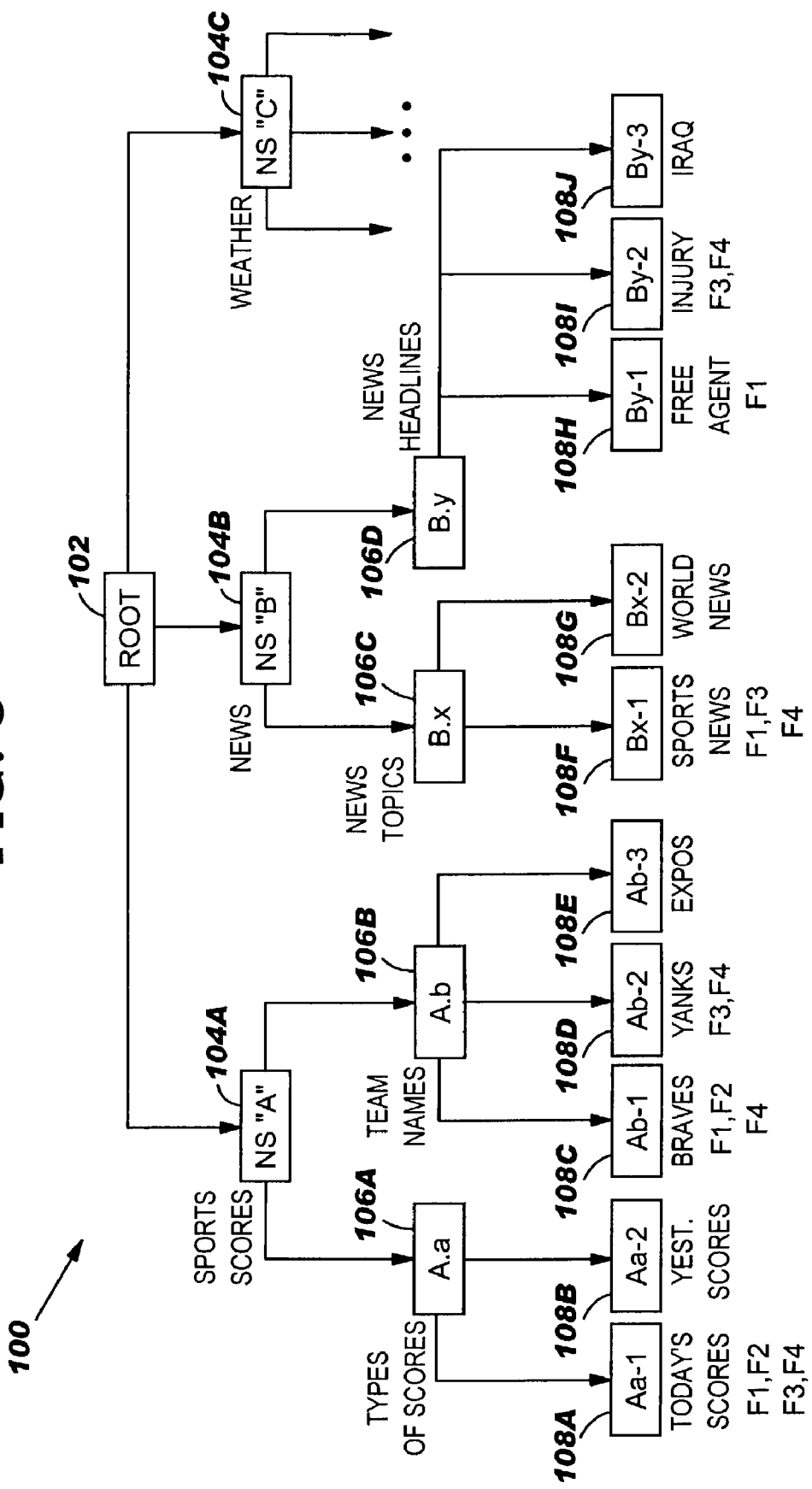
FIG. 3 depicts an illustrative hierarchical tree, according to the present invention.

Referring now to FIGS. 2 and 3, the functions of matching system 26 will be further shown and described in greater detail. As depicted, tree generation system 28 includes node system 50 and transformation system 52. Node system 50 generates a hierarchical tree of nodes that is based on the types/categories of information contained in network documents 40. Referring specifically to FIG. 3, an illustrative hierarchical tree 100 according to the present invention is shown. In general, hierarchical tree 100 includes a set of namespace nodes 104A-C that are immediate children of root 102. Hierarchical tree 100 also includes a set of element nodes 106A-D that are children of namespace nodes 104A-C, and a set of variable nodes 108A-J that are children of element nodes 106A-D. It should be understood that hierarchical tree 100 is illustrative only and that the quantity of nodes and/or levels depicted therein is not intended to be limiting. To this extent, additional "levels" and/or nodes of hierarchical tree 100 could be implemented within the teachings of the present invention.

Under the present invention, namespace nodes 104A-C typically pertain to broad categories of information such as those defined by XML namespaces. For example, namespace node 104A could pertain to "Sports Scores," namespace node 104B could pertain to "News," while namespace node 104C could pertain to "Weather." Element nodes 106A-D are subcategories of namespace nodes 104A-D. For example, element node 106A could pertain "Types of Scores," while element node 106B could pertain to "Team Name." Similarly, element node 106C could pertain to "New Topics," while element node 106D could pertain to "News Headlines." Variable nodes 108A-J are subcategories of their respective parent element nodes 106A-D. For example, variable node 108A could pertain to "Today's Scores," variable node 108B could pertain to "Yesterday's Scores," variable node 108C could pertain to the "Atlanta Braves," variable node 108D could pertain to the "New York Yankees," while variable node 108E could pertain to the "Montreal Expos." Similarly, variable node 108F could pertain to the "Sports News" and variable node 108G could pertain to the "World News." Still yet, variable node 108H could pertain to "Free Agent Signings," variable node 108I could pertain to "Injury Reports," while variable node 108J could pertain to "Iraq."

Under the present invention filters 44 are associated with the variable nodes 108A-108J of hierarchical tree. To make this association, each filter 44 is transformed into a set of variables by transformation system 52, and then associated with variable nodes 108A-108J by node system 50. For example, assume the following filters having the corresponding requirements have been created:

F1: ((A.b="Braves") AND (A.a="Today's Scores")) OR ((B.x="Sports news") AND (B.y CONTAINS "Free Agent"))—created by User "A"

Requirements: User "A" only wishes to receive network documents that have today's score for the Atlanta Braves, or that have sports news regarding free agent signings.

F2: (A.b="Braves) AND (A.a="Today's Scores")—Created by User "B"

Requirement: User "B" only wishes to receive network documents that have today's score for the Atlanta Braves.

F3: ((A.b="Yankees") AND (A.a="Today's Scores")) OR ((B.x="Sports News") AND (B.y CONTAINS "Injuries"))—Created by User "C"

Requirements: User "C" only wishes to receive network documents that have today's score for the New York Yankees, or that have sports news regarding injuries.

F4: (((A.b="Braves") OR (A.b="Yankees)) AND (A.a="Today's Scores")) OR ((B.x="Sports News) AND (B.y CONTAINS "Injuries"))—created by User "D"

Requirements: User "D" only wishes to receive network documents that have today's score for the Atlanta Braves or for the New York Yankees, or that have sports news regarding injuries.

As can be seen the filters could be implemented with Boolean logical operators so that a single filter could be made to contain multiple requirements. In any event, the "A.a," "A.b," "B.x," and "B.y" portions of the filters pertain to particular namespace and element nodes on hierarchical tree 100. Specifically, "A.a" pertains to namespace node 104A and element node 106A. "A.b" pertains to namespace node 104A and element node 106B, respectively. Similarly, "B.x" pertains to namespace node 104B and element node 106C. "B.y" pertains to namespace node 104B and element node 106D. The remaining portions of the filters (e.g., "Braves", "Free Agent," etc.) pertain to particular variable nodes with which the filters will be associated. Transformation system 52 transforms each of these filters into a set of variables, which are then associated with the variable nodes by node system 50. As can been seen, the above illustrative filters include one type of "A.a" requirement (e.g., A.a="Today's Score"), two different types of "A.b" requirements (e.g., A.b="Braves" and A.b="Yankees"), one type of "B.x" requirement (e.g., B.x="Sports news"), and two different types of "B.y" requirements (e.g., B.y CONTAINS "Free Agent" and B.y CONTAINS "Injuries").

Transformation system 52 transforms the filters by assigning a variable to each requirement in each filter. For example, the requirements of (A.b="Braves") could be transformed into the variable of Ab-1, with the "1" indicating that this requirement is the first instance of an "A.b" type of requirement. Following this logic, the requirements of the filters could be transformed as follows:

Aa-1=(A.a="Today's Scores)
Ab-1=(A.b="Braves")
Ab-2=(A.b="Yankees")
Bx-1=(B.x="Sports news")
By-1=(B.y CONTAINS "Free Agent")
By-2=(B.y CONTAINS "Injuries")

The filters themselves are transformed by substituting these variables for their respective requirements. Accordingly, the transformed filters would appear as follows:

F1: (Aa-1 AND Ab-1) AND (Bx-1 AND By-1)
F2: Aa-1 AND Ab-1
F3: (Aa-1 AND Ab-2) OR (Bx-1 AND By-2)
F4: (Aa-1 AND (Ab-1OR Ab-2)) OR (Bx-1 AND By-2)

As can be seen in FIG. 3 these variables are arranged as (e.g., correspond to) particular variable nodes 108A-J of hierarchical tree 100. After transformation, node system 50 associates each filter with one or more corresponding variable nodes 108A-J. For example, since filter "F1" contains the variables of Aa-1, Ab-1, Bx-1 and By-1, it is associated with variable nodes 108A, 108C, 108F and 108H. Similarly, filter "F2" is associated with variable nodes 108A and 108C, filter "F3" is associated with variable nodes 108A, 108D, 108F and 108I, and while filter "F4" is associated with variable nodes 108A, 108C, 108D, 108F and 108I.

It should be appreciated that although not shown, filters F1-F4 could have been arranged within hierarchical tree 100 as child "filter" nodes of variable nodes. For example, variable node 108C could be provided with three child filter nodes (e.g., a first for filter "F1," a second for filter "F2," and a third for filter "F4"). To this extent, as used herein with reference to the relationship between the filters and variable nodes, the term "associate" is intended to mean both the correlation of filters with variable nodes shown in FIG. 3, as well as the arrangement of filters in separate filter nodes (not shown).

Once tree generation system 26 has generated hierarchical tree 100 and associated filters 44 with the variable nodes 108A-J, filter identification system will identify the filters that correspond to network documents 40. Specifically, as shown, filter identification system 30 includes parsing system 54 and comparison system 56. Parsing system 54 will parse each network document to identify the namespace, a set of elements, and a set of variables therein. For example, assume the following network document 40 was received and parsed:

```
<?xml version="1.0" encoding="UTF-8"?>
<ss:score xmlns:ss="http://sportsscores.com/scores" homeScore=2 awayScore=1>
   <ss:scores> Today's </scores>
   <ss:team name="Braves" position="Home"/>
   <ss:team name="Expos" position = "Away"/>
</ss:score>
```

From the web address listed in the second line of the document, parsing system 54 would identify the namespace as being "Sports Scores." Similarly, the elements of "Today's Scores," and "Team Name" are listed and would be identified. Further, the variables of "Braves" and "Expos" would be identified.

Comparison system 56 will compare this information to the hierarchical tree 100 to identify a set of corresponding filters. Under the present invention, the set of corresponding filters are identified by using the identified namespace, elements and variables to follow along the appropriate branches of hierarchical tree 100. Based on the namespace and elements in the above illustrated network document 40, namespace node 104A and element nodes 106A and 106B would be followed. Moreover, based on the variables of "Today's Scores," "Braves" and "Expos," variable nodes 108A, 108C and 108E would be identified. All other branches and/or nodes in hierarchical tree 100 could then be automatically disregarded.

Any filters associated with variable nodes 108A, 108C and 108E are identified as corresponding to the network document 40. In a typical embodiment, comparison system 56 adds each corresponding filter to a list. Based on this example, all filters "F1" "F2," "F3," and "F4" would be added to the list as corresponding to the network document (i.e., because each filter was associated with at least one of element nodes 108A and 108C).

Once the set of corresponding filters have been identified and added to the list, filter evaluation system 32 will evaluate each corresponding filter based on the network document 40 to determine if each filter is actually satisfied by the network document 40. That is, filter evaluation system 32 will identify a set of satisfied filters from the set of corresponding filters. As mentioned above, a filter could have multiple requirements. If one of those requirements were met, the filter would have been added to the list. However, it could be the case that one or more of the other requirements in the filter were not met and, as such, is not satisfied. In this example, filters "F1," "F2," "F3," and "F4" would be evaluated. As indicated above, filter "F1" was created by user "A" and requires that the network document 40 contains today's scores for the Atlanta Braves game, AND sports news concerning free agent signings. Filter "F2" was created by user "B" and only requires that the network document 40 only contain today's scores for the Atlanta Braves game. Filter "F3" was created by user "C" and requires that the network document 40 have today's scores for the New York Yankees, or sports new regarding injuries. Filter "F4" was created by user "D" and requires that the network document 40 contain today's scores for the Atlanta Braves game or the New York Yankees, OR sports news concerning injuries.

In evaluating filter "F1" against the network document 40, it can be seen that all necessary requirements are met. Specifically, filter F1 only required that the network document 40 contain either today's scores for the Braves, or sports news regarding free agent signings. Since the network document 40 contained today's score for the Braves, the filter is satisfied (i.e., matches) the network document. Similarly, because its only requirement is that the network document 40 contains today's sports score for the Atlanta Braves, filter "F2" is satisfied. Still yet, because filter "F4" required that the network document contain today's score for either the Braves or the Yankees, or sports news regarding injuries, filter "F4 was satisfied. Conversely, because the network document 40 failed to include either today's score for the Yankees or sports news regarding injuries, the network document 40 failed to satisfy filter "F3."

After the evaluation process, communication system 34 will communicate the matching network documents 40 to the users 46 who correspond to the identified set of satisfied filters. In this example, the network document 40 will be communicated to users "A," "B" and "D" who were the only users that corresponded to satisfied filters "F1," "F2" and "F4." If the network document 40 failed to satisfy any filters, it would not be communicated to any users 46.

As can be seen, the present invention provides a more efficient process for identifying satisfied filters and corresponding users. Specifically, as mentioned above, any branches/nodes of the hierarchical tree 100 that do not correspond to information within a network document 40 can be automatically disregarded. Similarly, any filters associated with disregarded nodes need not be processed (i.e., can be disregarded as well). Accordingly, the present invention alleviates the issues associated with evaluating every filter against every document, as well as the issues associated with communicating every network document 40 every user system 36.

It should be understood that the present invention could be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although a specific embodiment of matching system 26 has been shown, it should be appreciated that such depiction is for illustrative purposes only and that many other implementations could exist. For example, the various systems within matching system 26 could be combined into fewer systems, as could the multiple sub-systems tree generation system 28 and filter identification system 30.

We claim:

1. A computer-implemented method for matching a network document with a set of filters, comprising:
    associating a set of filters, corresponding to a plurality of users, with a set of nodes of a hierarchical tree on a server, every node in the set of nodes corresponding to a different type of information contained in network documents;
    identifying a set of corresponding filters from the set of filters by comparing the network document to the hierarchical tree; and
    evaluating the set of corresponding filters based on the network document to simultaneously identify a set of satisfied filters for the plurality of users,
    wherein the hierarchical tree is designed to identify the network document for the plurality of users and to provide a computer of a user only network documents associated with filter for the user without performing a search for each user.

2. The method of claim 1, further comprising matching the network document with the set of satisfied filters.

3. The method of claim 1, further comprising communicating the network document to the users that correspond to the set of satisfied filters.

4. The method of claim 1, further comprising adding the set of corresponding filters to a list, prior to the evaluating step.

5. The method of claim 1, wherein the associating step comprises:
    transforming the set of filters into a set of variables;
    arranging the set of variables into a set of variable nodes of the hierarchical tree; and
    associating the set of filters with the set of variable nodes.

6. The method of claim 5, wherein the variable nodes are children of element nodes, and wherein the element nodes are children of namespace nodes of the hierarchical tree.

7. The method of claim 1, further comprising parsing the network document.

8. The method of claim 7, wherein the identifying step comprises comparing information within the parsed network document to the hierarchical tree to identify a set of satisfied namespace nodes, a set of satisfied element nodes and a set of satisfied variable nodes, wherein the set of corresponding filters are associated with the set of satisfied variable nodes.

9. The method of claim 8, wherein nodes other than the set of satisfied namespace nodes, the set of satisfied element nodes and the set of satisfied variable nodes are automatically disregarded when identifying the set of corresponding filters.

10. A system for matching a network document with a set of filters, comprising:
    a processor,
    a tree generation system, executing on the processor, for generating a hierarchical tree and for associating a set of filters, corresponding to a plurality of users, with a set of nodes of the hierarchical tree on a server, every node in the set of nodes corresponding to a different type of information contained in network documents;
    a filter identification system for identifying a set of corresponding filters from the set of filters by comparing the network document to the hierarchical tree; and
    a filter evaluation system for evaluating the set of corresponding filters based on the network document to simultaneously identify a set of satisfied filters for the plurality of users,
    wherein the hierarchical tree is designed to identify the network document for the plurality of users and to provide a computer of a user only network documents associated with filter for the user without performing a search for each user.

11. The system of claim 10, wherein the network document is matched with the set of satisfied filters.

12. The system of claim 10, further comprising a communication system for communicating the network document to the users that correspond to the set of satisfied filters.

13. The system of claim 10, wherein the hierarchical tree comprises:
    a set of namespace nodes;
    a set of element nodes that are children of the set of namespace nodes; and
    a set of variable nodes that are children of the set of element nodes.

14. The system of claim 10, wherein the tree generation system comprises:
    a transformation system for transforming the set of filters into a set of variables; and
    a node system arranging the set of variables into a set of variable nodes of the hierarchical tree, and for associating the set of filters with the set of variable nodes.

15. The system of claim 10, wherein the filter identification system comprises:
    a parsing system for parsing the network document; and
    a comparison system for comparing information within the parsed network document to the hierarchical tree to identify a set of satisfied namespace nodes, a set of satisfied element nodes and a set of satisfied variable nodes, wherein the set of corresponding filters are associated with the set of satisfied variable nodes.

16. The system of claim 15, wherein nodes other than the set of satisfied namespace nodes, the set of satisfied element nodes and the set of satisfied variable nodes are automatically disregarded when identifying the set of corresponding filters.

17. The system of claim 15, wherein the comparison system further adds the set of corresponding filters to a list, prior to the evaluating step.

18. A program product stored on a recordable medium for matching a network document with a set of satisfied filters, which when executed by a computer, comprises:
    program code for generating a hierarchical tree and for associating a set of filters, corresponding to a plurality of users, with a set of nodes of the hierarchical tree on a server, every node in the set of nodes corresponding to a different type of information contained in network documents;
    program code for identifying a set of corresponding filters from the set of filters by comparing the network document to the hierarchical tree; and program code for evaluating the set of corresponding filters based on the network document to simultaneously identify a set of satisfied filters for the plurality of users, wherein the hierarchical tree is designed to identify the network document for the plurality of users and to provide a computer of a user only network documents associated with filter for the user without performing a search for each user.

19. The program product of claim 18, wherein the network document is matched with the set of satisfied filters.

20. The program product of claim 18, further comprising a communication system for communicating the network document to the users that correspond to the set of satisfied filters.

21. The program product of claim 18, wherein the hierarchical tree comprises:
- a set of namespace nodes;
- a set of element nodes that are children of the set of namespace nodes; and
- a set of variable nodes that are children of the set of element nodes.

22. The program product of claim 18, wherein the program code for generating comprises:

program code for transforming the set of filters into a set of variables; and program code arranging the set of variables into a set of variable nodes of the hierarchical tree, and for associating the set of filters with the set of variable nodes.

23. The program product of claim 18, wherein the program code for identifying comprises:

program code for parsing the network document; and program code for comparing information within the parsed network document to the hierarchical tree to identify a set of satisfied namespace nodes, a set of satisfied element nodes and a set of satisfied variable nodes, wherein the set of corresponding filters are associated with the set of satisfied variable nodes.

24. The program product of claim 23, wherein nodes other than the set of satisfied namespace nodes, the set of satisfied element nodes and the set of satisfied variable nodes are automatically disregarded when identifying the set of corresponding filters.

25. The program product of claim 23, wherein the program code for comparing further adds the set of corresponding filters to a list, prior to the evaluating step.

* * * * *